United States Patent [19]

Neufeld

[11] Patent Number: 4,728,151
[45] Date of Patent: Mar. 1, 1988

[54] CHILD'S FEET RECEIVING DEVICE FOR USE ON A VEHICLE SEAT

[76] Inventor: Rodney G. Neufeld, Box 1685, Morden, Manitoba, Canada, R0G 1J0

[21] Appl. No.: 43,801

[22] Filed: Apr. 29, 1987

[30] Foreign Application Priority Data

May 6, 1986 [CA] Canada ............................ 508506

[51] Int. Cl.⁴ .................................. A47C 9/12
[52] U.S. Cl. .......................... 297/438; 297/423; 297/250
[58] Field of Search .............. 297/423, 438, 250; 108/152; 211/135

[56] References Cited

U.S. PATENT DOCUMENTS

| 2,308,315 | 1/1943 | Smith ............................ 297/250 |
| 2,359,599 | 10/1944 | Allen . |
| 2,526,576 | 10/1950 | Nelson . |
| 2,615,503 | 10/1952 | Enge ............................ 297/438 |
| 2,777,502 | 1/1957 | Travis ........................... 297/250 |
| 2,986,437 | 5/1961 | Davis ........................... 297/438 X |
| 3,207,552 | 9/1965 | Loughney, Jr. ............... 297/250 X |
| 3,295,887 | 6/1965 | Bacon . |
| 3,298,736 | 1/1967 | Decker . |
| 3,325,213 | 6/1967 | Levy ............................ 297/250 X |
| 3,426,368 | 2/1969 | McCluskey . |
| 3,428,361 | 2/1969 | Reynolds . |
| 3,606,458 | 9/1971 | Attinger ....................... 297/423 X |
| 3,787,903 | 1/1974 | Miller . |
| 3,919,950 | 11/1975 | Frazelle ....................... 211/135 |
| 4,074,653 | 2/1978 | Stauble ........................ 108/152 X |
| 4,198,716 | 4/1980 | Hollyday, III ............... 297/438 X |
| 4,203,373 | 5/1980 | Conti ........................... 108/152 |
| 4,240,662 | 12/1980 | Anderson . |

FOREIGN PATENT DOCUMENTS 102118 7/1941 Sweden ............................ 297/250

Primary Examiner—Peter A. Aschenbrenner
Attorney, Agent, or Firm—Stanley G. Ade; Adrian D. Battison

[57] ABSTRACT

A device for resting upon the seat of a vehicle for receiving the feet of a child in a child's seat or the like on the vehicle seat comprises an upper receiving surface which is supported by a support surface relative to the seat so as to be inclined slightly forwardly from a rear edge toward an apron at a front edge which overturns the front edge of the seat and extends downwardly therefrom. A side wall around the receiving surface prevents liquid from running to the sides and confines the feet of the child onto the surface. The device is formed by rotational moulding so as to form a hollow body with a flat lower supporting surface, a rear upstanding wall and the receiving surface which are triangular in shape with a hollow interior.

11 Claims, 4 Drawing Figures

CHILD'S FEET RECEIVING DEVICE FOR USE ON A VEHICLE SEAT

BACKGROUND OF THE INVENTION

This invention relates to a child's feet receiving device for use on a vehicle seat. Young children before they are old enough to sit comfortably on a vehicle seat in many cases use a specially designed car seat which rigidly attaches to the vehicle on top of a normal passenger seat and includes straps for retaining the child in the child's seat. Such designs have now developed into fully satisfactory arrangements which operate to retain the child effectively within the vehicle and to allow the child to sit and see comfortably.

However the child is seated above the normal passenger seat with its legs depending downwardly from a flat seat portion of the child seat toward the normal passenger seat. The feet thus in many cases rest directly upon the vehicle seat which can provide a comfortable arrangement for the child in that its feet are properly supported with the child seat defining a seat portion of a convenient seating height above the vehicle seat.

This leaves the child's feet and shoes resting upon the vehicle seat. Even at times when the ground outside is dry, this can transport dust and other foreign materials onto the vehicle seat thus spoiling the upholstery. When the ground outside is wet or covered with snow, the child's shoes can transport dirty, staining, water or moisture onto the vehicle seat which can seriously degrade the upholstery.

One device which has been proposed to overcome this problem comprises little more than a flat plastic sheet which is placed between the vehicle seat and the child's seat both down the back of the vehicle seat and across the seat portion to an edge which depends over the front edge of the vehicle seat. However this is merely a cover sheet which does not prevent any liquid which collects on the sheet from running across the sheet and off the sheet back onto the vehicle seat.

It is one object of the invention, therefore, to provide an improved device for receiving the feet of a child on a vehicle seat which prevents liquid from running from the device onto the vehicle seat.

According to the invention, therefore, there is provided a device for resting on the seat of a vehicle and for receiving the feet of a child on the seat, the device comprising an integral unitary semi-rigid plastic moulding defining a generally horizontal receiving surface, an upstanding wall member surrounding said receiving surface at a rear edge and along opposed side edges thereof, a downturned apron portion at a front edge of said receiving surface and a support surface for engaging an upper surface of the seat, said support surface being inclined to said receiving surface at an acute angle thereto whereby with said support surface resting on the seat said receiving surface is inclined slightly forwardly from said wall member at said rear edge toward said apron portion.

The device is properly shaped therefore to define a receiving surface which is retained horizontal or leaning slightly forwardly by the configuration with the support surface. Any liquid carried into the vehicle on the shoes of the child or from melting snow on or around the child runs forwardly over the apron toward the ground.

Preferably the device is designed as a separate unit which can be attached to a separate child's seat mounted on the vehicle seat. In this case the width of the device can be chosen so that it slips between the conventional legs of a child's seat of this type thus allowing it to be positioned as required relative to the child seat and relative to the front edge of the vehicle seat to accommodate different depths of vehicle seat from the front edge to the rear edge.

Preferably the device is hollow and is formed with a rear wall extending upwardly from the support surface so as to define the upstanding wall member and so as to interconnect the support surface and the receiving surface.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 4 is a plan view of the device, child seat and vehicle seat of FIG. 3.

In the drawings like characters of reference indicate corresponding parts in the different figures.

DETAILED DESCRIPTION

Figure 2:
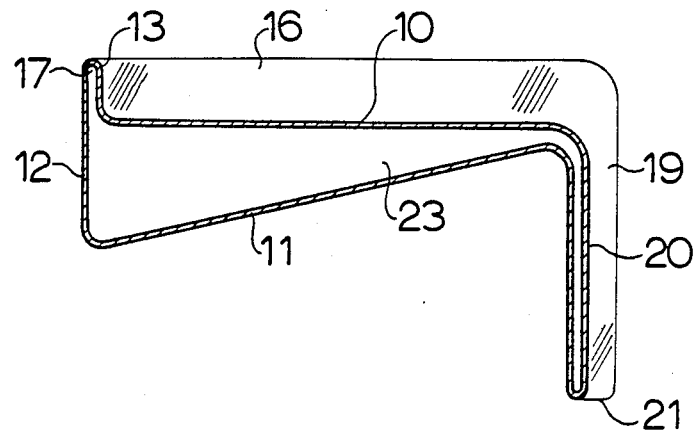
FIG. 2 is a cross sectional view long lines 2—2 of FIG. 1.
Figure 3:
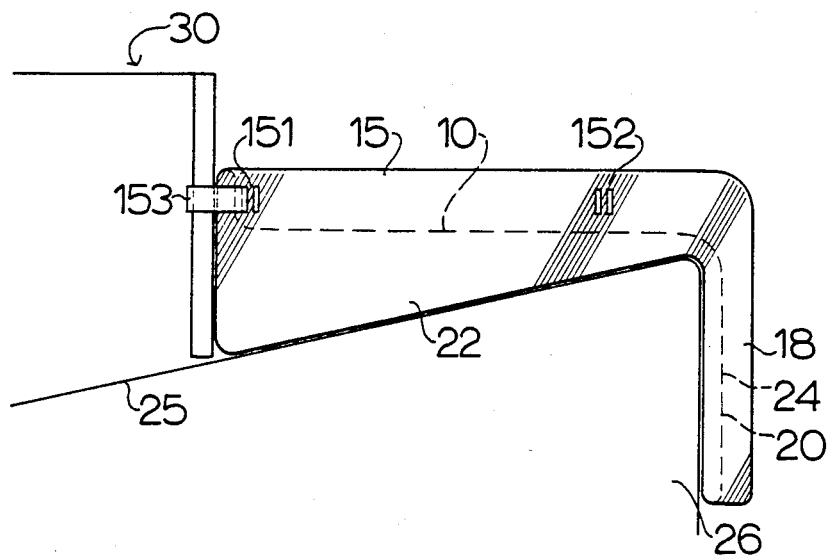
FIG. 3 is a side elevational view of the device of FIG. 1 in operation with a child's seat on a vehicle seat.

The device comprises a hollow rotationally moulded plastic body defining a receiving surface or wall 10 and a support wall 11 which is arranged at an angle to the receiving wall as shown best in FIG. 2 thus defining a substantial triangle area therebetween. The support wall 11 is connected to the receiving wall 10 by an upstanding rear wall 12 which is smoothly connected to the support wall 11 at a lower apex thereof which extends upwardly therefrom into an upstanding wall portion 13 which stands above the receiving surface 10 and defines a peripheral surrounding wall for the surface 10.

Figure 1:
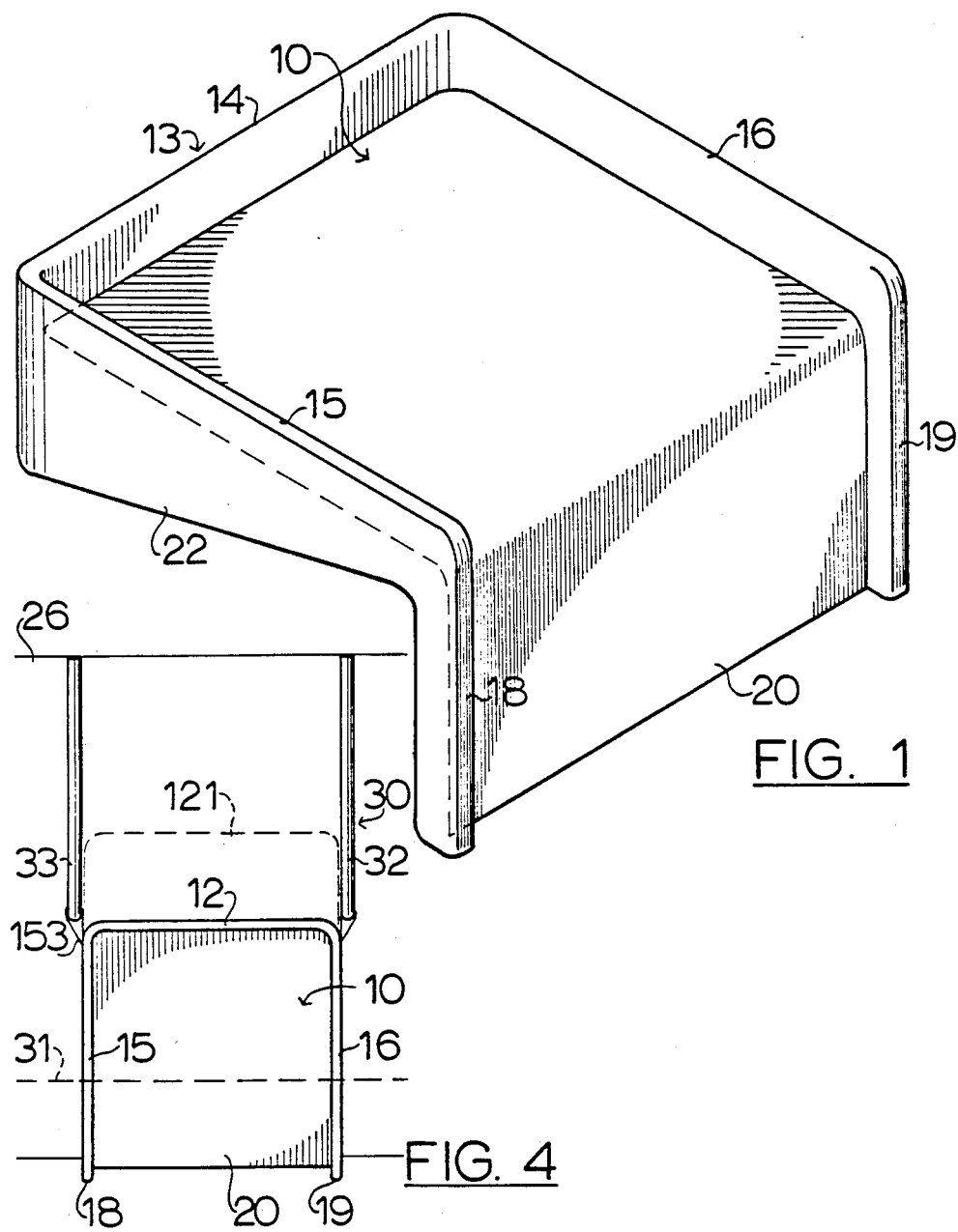
FIG. 1 is an isometric view of a device according to the invention.

The surrounding wall 13 includes a rear portion 14 and a pair of sides 15, 16 all of which are connected contiguously at corners of the receiving wall as shown best in FIG. 1. The wall 13 is also formed with a hollow interior thus defining an inside and outside wall portion spaced as indicated at 17.

The side walls 15 and 16 extend to a front edge of the receiving wall 10 and then turn downwardly as indicated at 18, 19 to define side walls of an apron section 20 which itself is smoothly connected to the receiving portion 10. The apron portion 20 is again formed from two adjacent wall portions one of which is connected to the supporting wall portion 11 at the upper apex thereof and the other of which extends from a lower most edge 21 of the apron portion to the receiving wall portion 20.

Side wall portions which are triangular in shape are shown at 22, 23 and interconnect the outstanding side walls 15 and 16 to support wall 11 at the sides in a similar manner to the rear wall 12.

This body defined by the walls is a rigid or semi-rigid structure providing a substantially horizontal receiving surface 10 and a vertical inclined apron surface 24. The angle between the support wall 11 and the receiving wall 10 is of the order of 30° which approximates to the angle to the horizontal of an upper surface 25 of a seat cushion 26 of a rear seat of a vehicle. Thus with the wall 11 resting upon the upper surface 25, the receiving surface 10 is maintained substantially horizontal or inclined slightly from the rear wall 14 toward the apron 20.

As best shown in FIG. 4, the upper surface 10 is rectangular and has a width of the order of 11 inches so that it is slightly less than the width of a child seat generally indicated at 30 resting upon the seat cushion 26. The dimension of the upper surface from the apron 16 to the rear 12 is of the order of 5 inches so that when used with a large vehicle having a large rear seat cushion from the rear edge to the front edge of the seat cushion, the device extends just from the front the child seat 30 to the front edge of the seat cushion 26. A seat cushion of smaller front to rear dimension is indicated in dotted line at 31 and in this case the device slips between the sides 32, 33 of the child seat to take up a position in dotted line at 121.

The vertical depth of the apron portion 20 is of the order of 3 inches so that it provides a sufficient channel for liquid running off the surface 10 to communicate it toward the ground but is not sufficiently long so that it will engage the upper edge of the transmission tunnel when the device is positioned centrally of the seat in a vehicle with such a transmission tunnel.

Each of the side walls 15 and 16 has in its outer wall two pairs of slots 151, 152 which act to receive a strap 153 for attachment of the side to a respective leg of the chair 30. The two pairs of slots allow the strap 153 to be positioned at different locations on the side so that the device can accommodate the different sizes as shown in FIG. 4. Thus the rear pair of slots 151 is arranged adjacent to the rear corner while the front pair of slots 152 is arranged approximately ¾ along the length toward the apron so that strap 153 can hold the device rearwardly toward the chair with rearward motion being prevented by the apron 18 on the nose of the seat cushion 26.

The semi-rigid body thus can be positioned beneath the feet of a child seated in the child's seat 30 so that the feet instead of resting upon the seat cushion 26 rest directly upon the upper surface 10 for receiving any dirt, liquid or snow which can then run from the surface 10 over the apron to the vehicle floor.

In an alternative arrangement (not shown) the device can constitute one part of either the child seat itself or one part of a booster seat so that the device is formed integrally with the child seat or with the booster seat and can sit on the seat cushion as explained for receiving the feet of the child in the child's seat or on the booster seat. However the shape of the support surface relative to the foot receiving surface remains the same to provide the desired angle for run-off of liquid or other materials and the position and arrangement of the side walls remains the same in order to prevent the liquid running toward the sides and in order to confine the feet of the child to the required area.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A device for resting on the seat of a vehicle and for receiving the feet of a child on the seat, the device comprising an integral unitary semirigid plastic moulding defining a generally horizontal receiving surface, and upstanding wall member surrounding said receiving surface at a rear edge and along opposed side edges thereof, a downturned apron portion at a front edge of said receiving surface and a support surface for engaging an upper surface of the seat, said support surface being inclined to said receiving surface at an acute angle thereto whereby said support surface resting on the seat said receiving surface is inclined slightly forwardly from said wall member at said rear edge toward said apron portion.

2. The invention according to claim 1 including means for attachment of said device to said seat.

3. The invention according to claim 1 wherein said device is arranged for use with a separate child seat on said vehicle seat, said device including means for attachment of said device to said child seat.

4. The invention according to claim 3 where said attachment means comprises a pair of straps attached on respective sides of said device for engaging said child seat.

5. The invention according to claim 1 wherein said wall member extends into and along side edges of said apron portion.

6. The invention according to claim 1 wherein said apron portion is turned vertically downwardly.

7. The invention according to claim 1 wherein said apron has a vertical depth of the order of 3 inches.

8. The invention according to claim 1 wherein the support surface is substantially planar.

9. The invention according to claim 8 wherein said support surface and said receiving surface converge toward an apex at an upper edge of said apron portion.

10. The invention according to claim 1 wherein said moulding is hollow between said receiving surface and said support surface and includes a rear wall extending therebetween so as to upstand from said seat surface and to form said upstanding wall member.

11. The invention according to claim 1 wherein said device is arranged for use with a child seat on said vehicle seat, the width of said receiving surface being such that the receiving surface and upstanding wall member can be received between side edges of the seat and beneath a seat portion of said seat.

* * * * *